P. L. WEIMER.
Machine for Finishing Lap Welded Tubes.

No. 50,781. Patented Oct. 31, 1865.

WITNESSES

INVENTOR
Peter L. Weimer

UNITED STATES PATENT OFFICE.

PETER L. WEIMER, OF LEBANON, PENNSYLVANIA, ASSIGNOR TO AURORA IRON COMPANY, OF SAME PLACE.

MACHINE FOR FINISHING LAP-WELDED TUBES.

Specification forming part of Letters Patent No. 50,781, dated October 31, 1865.

*To all whom it may concern:*

Be it known that I, PETER L. WEIMER, of Lebanon, in the county of Lebanon and State of Pennsylvania, have invented a Machine for Finishing "Lap-Welded" Tubes; and I do hereby declare that the following is a full, clear, and exact description thereof, reference being had to the accompanying drawings, making a part of this specification, in which—

Figure 1:
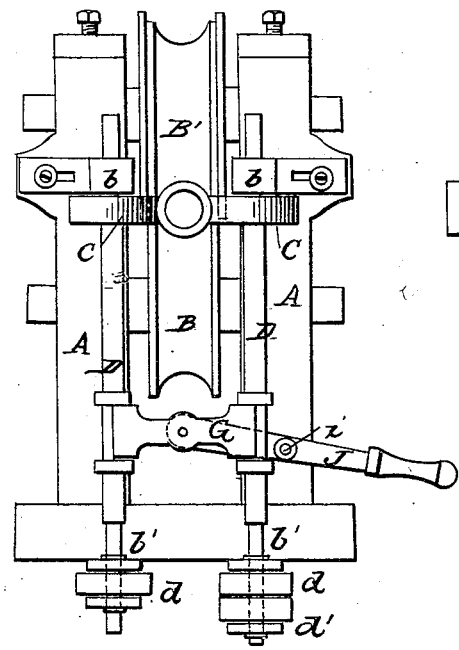
Figure 3:
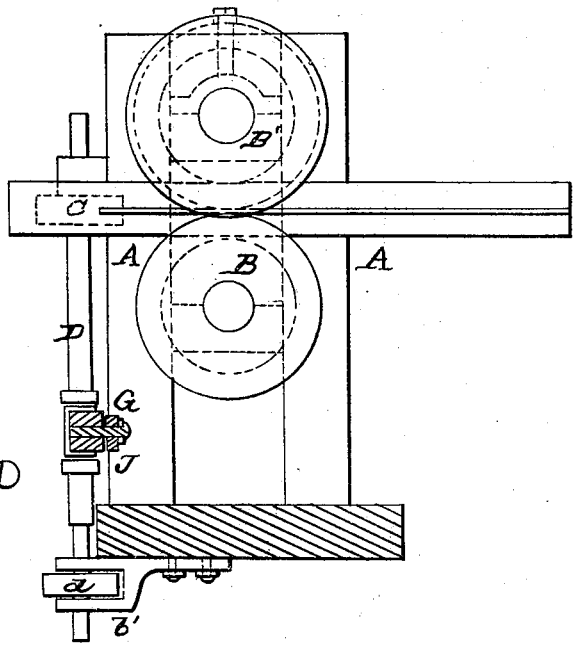
Figure 2:
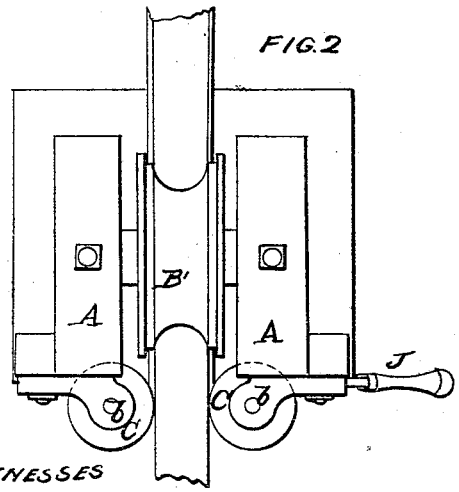
Figure 4:
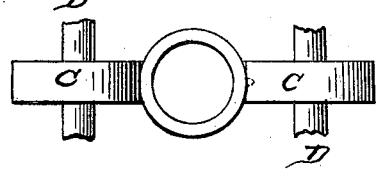

Figure 1 is a front elevation of my new machine for finishing welded tubing. Fig. 2 is a top view of the same. Fig. 3 is a vertical section, and Fig. 4 is an enlarged view, of two circular cutters applied to a pipe.

Similar letters of reference indicate corresponding parts in the several figures.

In the process of making the ordinary lap-welded tubing, burrs or fins are formed along its sides, in consequence of the pressure-rollers springing apart and allowing the metal to spread out between them. These burrs or fins on the outside surface of the tubing must be removed and the surface rendered smooth before the tubing is subjected to the strengthening machinery. Hitherto the operation of removing the fins from lap-welded tubing was performed by hand. I now desire to remove the fins by machinery, and as rapidly as the tubing leaves the pressure-rollers, as will be hereinafter described.

To enable others skilled in the art to understand my invention, I will describe its construction and operation.

In the accompanying drawings I have represented my invention for removing the fins from the tubing applied to the frame A of two rollers, B B', which are used in forming the tubing, and which form or leave upon it said fins, as shown in Figs. 2, 3, and 4. The rollers B B' have grooves formed in their peripheries, adapted for giving the cylindrical form to the tubing, and the roller B' has a flange around it, which overlaps the sides of the roller B at the point of contact of the two rollers, as shown in Figs. 1 and 3. The fins are formed on the outside surface of the tubing by the spreading of the metal between the edges of the rollers while forming the tubing, as indicated in Figs. 1 and 4.

C C represent two circular files or cutters of any suitable description which will remove the fins from the tubing. These cutters or files are keyed to the vertical spindles D D, which have end bearings in brackets $b$ $b'$, that are secured to the frame A in such manner as to admit of the cutters C C being adjusted laterally toward or from each other for the purpose of adapting them to tubing of different diameters.

The lower brackets receive pulleys $d$ $d$ $d'$ between them, which have tubular journals through which the square ends of the spindles D D freely pass. This will admit of the spindles receiving a vertical movement, and at the same time the pulleys $d$ $d$ will give them a rapid rotary movement. The rotary movement is communicated to the pulleys by means of belts, which I have not shown in the drawings.

The spindles D D are connected together by means of a yoke, G, to the middle of which one end of a hand-lever, J, is suitably pivoted. This lever has its fulcrum at $i$ on the side of frame A, and it is used for the purpose of giving a vertical up-and-down movement to the spindles and their cutters during the rotation thereof.

The circular cutters C C are represented as being in a horizonal plane; but it is evident that they can be made to operate with equal efficiency upon the tubing when arranged in vertical planes, and the circumferences or sides of these files or cutters may be made to act upon the tubing as it passes between them. These cutters or files are made quite thick, if used as represented in the drawings, for the purpose of allowing them to be moved up or down by means of lever J and always keeping their surfaces in contact with the tubing. By giving the vertical movement above described to said cutters or files their surfaces will wear smooth, whereas, if they were not to receive this movement, a groove would soon be formed in the periphery of each cutter and they would fail to remove the fins from the tubing. These circular cutters or files may be made of steel with cutting-points or file-serrations, or they may be made of compounds containing emery.

It may be found necessary to prevent the cutters from heating. If so, sponges may be secured to the frame A so as to impinge upon the cutters and keep them wet, or small streams of water may be allowed to run upon them.

Having described my invention, what I claim as new, and desire to secure by Letters Patent, is—

1. Removing the fins from lap-welded tubing as it leaves the pressing-rollers by means of rotary cutters or files, substantially as described.

2. Providing for giving a vertical movement to the fin-cutters at the same time that they receive a rotary motion, substantially as described.

P. L. WEIMER.

Witnesses:
CYRUS S. GEORGE,
ANTHONY S. ELY.